No. 787,103. Patented April 11, 1905.

UNITED STATES PATENT OFFICE.

JOHANN NICOLAUS LUDWIG, OF MAINZ, GERMANY.

PROCESS OF DEVELOPING PHOTOGRAPHIC PLATES OR THE LIKE IN OPEN DAYLIGHT.

SPECIFICATION forming part of Letters Patent No. 787,103, dated April 11, 1905.

Application filed February 17, 1902. Serial No. 94,572.

*To all whom it may concern:*

Be it known that I, JOHANN NICOLAUS LUDWIG, a subject of the German Emperor, and a resident of Mainz, Germany, have invented certain new and useful Improvements in Processes of Developing Photographic Plates or the Like in Open Daylight, of which the following is a specification.

The present invention relates to an improved process whereby photographic plates may be removed directly from a camera or plate-holder and developed in daylight, thus avoiding the necessity and inconvenience of the operator entering a dark room to transfer the plates to the developing solution and remaining there until the development is wholly or partially accomplished.

I have found that certain coloring-matters have the property of coloring or coating the sensitive surface of photographic plates and films so as to render them insensitive to actinic rays of light and that a photographic plate or film after it has been exposed in a camera may have this coating applied thereto, so that it may be transferred to the developer in daylight. Not all coloring materials, of course, are capable of producing this result, the most suitable of course being those that will retain the greatest quantity of actinic rays.

A coloring material suitable for the purpose is that known as "scarlet saffron 3B;" but of course any other coloring material capable of producing the desired result may be used.

In proceeding according to my invention, for example, after exposing the plate in an ordinary camera I apply the liquid to the plate before it is removed. When an ordinary metallic plate-holder is used, the liquid may be poured into the plate-holder through a small opening, so as to thoroughly coat the plate, and it may then be withdrawn from the plate-holder in ordinary daylight and developed in the usual way.

When a magazine plate or film camera is used of that nature in which the plates or films after exposure drop or pass into a separate part of the camera—as, for instance, the bottom of the camera—the coating liquid may be applied to the plates or films while in such part.

I am aware that it has been heretofore proposed to apply a coloring solution to the developer, so that after the plates have become partially developed the process of development may be finished in ordinary daylight, and I therefore do not claim so broadly as to include such process.

Having now fully described my invention, what I claim, and desire to secure by Letters Patent, is—

The process of treating photographic plates or films which consists in first treating the exposed negative while still in the receptacle in which it has been exposed with a coloring material adapted to absorb actinic light, and subsequently developing the coated plate in an ordinary developer by daylight, substantially as described.

In testimony whereof I have hereunto set my hand in presence of two witnesses.

JOHANN NICOLAUS LUDWIG.

Witnesses:
WALTER HAUSING,
WALTER SCHUMANN.